No. 654,672. Patented July 31, 1900.
H. T. RICH.
BICYCLE LOCK.
(Application filed Sept. 5, 1899.)

(No Model.)

Witnesses  Harry T. Rich  Inventor

UNITED STATES PATENT OFFICE.

HARRY T. RICH, OF LYNN, MASSACHUSETTS.

BICYCLE-LOCK.

SPECIFICATION forming part of Letters Patent No. 654,672, dated July 31, 1900.

Application filed September 5, 1899. Serial No. 729,541. (No model.)

*To all whom it may concern:*

Be it known that I, HARRY T. RICH, a citizen of the United States, residing at Lynn, in the county of Essex and State of Massachusetts, have invented a new and useful Bicycle-Lock, of which the following is a specification.

The invention relates to improvements in bicycle-locks.

The object of the present invention is to improve the construction of bicycle-locks and to provide a simple, inexpensive, and efficient one adapted to be readily applied to the rear forks of a bicycle and capable of being arranged to form a temporary locking device.

The invention consists in the construction and novel combination and arrangement of parts hereinafter fully described, illustrated in the accompanying drawings, and pointed out in the claim hereto appended.

Figure 1:
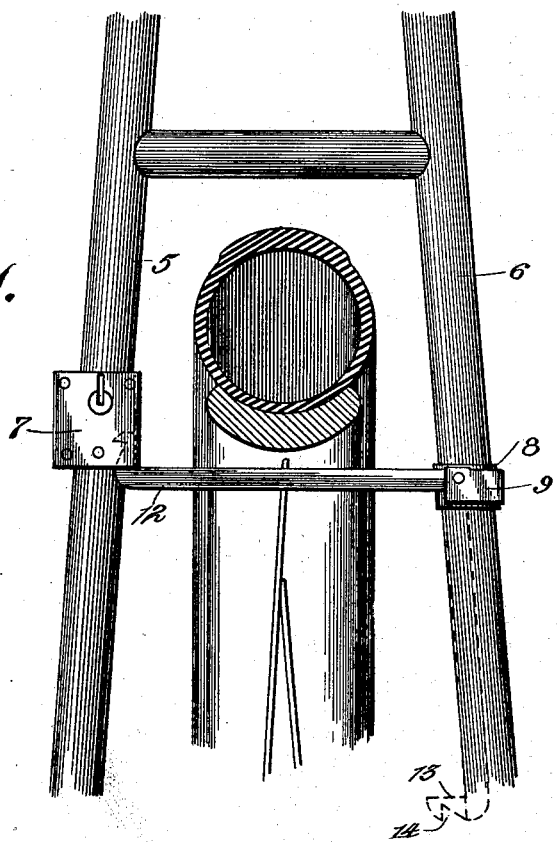
Figure 3:
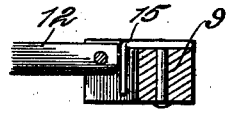
Figure 4:
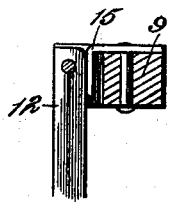
Figure 2:
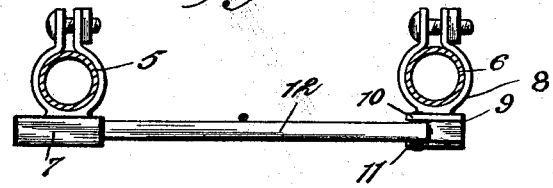

In the drawings forming a portion of this specification, and in which like reference-numerals designate corresponding parts in the several views, Figure 1 is a view showing a portion of the rear fork of a bicycle, the wheel being shown in section, and indicating the location and the operation of the lock. Fig. 2 is a section taken transversely of the fork above the lock and showing the position of the locking-arm with respect to a spoke of a wheel. Fig. 3 is a detail view, partially in section and partially in elevation, showing the location and operation of the arm-holding spring when the arm is in its operative position. Fig. 4 is a view similar to Fig. 3 and showing the arm in its inoperative position.

Referring now to the drawings, 5 and 6 represent the sides of the rear fork of a bicycle-frame, to one of which is fixed a lock-casing 7, having the nature of a padlock-casing and provided with an opening for the reception of a locking-arm, which is held in engagement therewith by a locking-bolt in the same manner as the bail of a padlock. Fixed to the opposite fork side 6 is a collar 8, having a U-shaped block 9, formed integral therewith, and comprising two parallel side portions 10 and 11. Intermediate these side portions 10 and 11 is pivoted one end of a locking-arm 12, the opposite end of which is provided with an upwardly-extending lug 13, which is adapted to enter the opening in the lock-casing 7, and which lug has a notch 14 for the reception of the locking-bolt, through the medium of which the lug is held within the casing and the locking-arm held transversely of the rear fork within the inclosure of the rear wheel and between the spokes thereof. The pivoted end of the arm is squared, as shown, and in order to hold the arm in both its retracted position and its engaging position, or operative position, a spring-plate 15 is riveted to the upper face of the block 9 and extends to a point between the parallel portions 10 and 11, after which it is bent downwardly to lie snugly against the end of the arm 12 when said arm is in its locking position. When the arm is unlocked, it is swung downwardly, and its lower corner at the pivoted end engages the spring-plate 15 and presses it backwardly, after which as the arm is further lowered the spring is gradually released and lies flat against the side of the arm, as shown in Fig. 4, and holds the arm yieldably in that position.

As shown in Fig. 1 of the drawings, the mechanism above described is disposed upon that portion of the rear fork which will permit the locking-arm 12 passing between the spokes of the rear wheel just below the felly, the presence of the locking-arm thus preventing rotation of the wheel.

The spring is adapted to engage the locking-bar when the same is in a vertical position at one side of the bicycle and also when the locking-bar is extended horizontally across the space between the rear forks, and by this construction the locking-bar may be held in a horizontal position to latch the wheel without manipulating the lock; also, the spring will prevent the locking-bar from accidentally swinging inward and contacting with the wheel when the bicycle is in motion.

Any suitable form of locking mechanism may be employed within the casing 7, and the clamps or collars for engaging the frame of the bicycle may be constructed in any suitable manner.

It will further be seen that when desired a number of bicycles may be locked together through the medium of this single lock by passing a chain through the wheels of the several bicycles and engaging the rings at the ends of the chains with the locking-bar of the bicycle-lock.

As clearly shown in Figs. 2 and 4 of the drawings, the spring 15 is of substantially an inverted-L shape, the horizontal shank member thereof being held between the sides of the substantially U-shaped bracket 9 and closing the space therebetween. The pendent spring arm or member extends between the sides of the bracket and is flexibly movable longitudinally between said sides and beneath the horizontal shank, which latter covers the space between the spring member and the outer closed end of the bracket, so as to prevent the lodgment of foreign matter between the sides of the bracket, and thereby guards against interference with the proper movement of the spring member.

By reference to Figs. 3 and 4 of the drawings it will be seen that the spring 15 alternately engages the adjacent angularly-disposed side and end portions of the locking-bar, so as to support the latter in both its inoperative and operative positions. By reason of this arrangement the locking-bar may be thrown upwardly and held by the spring until the locking mechanism has been operated to fixedly support the bar. As the locking-bar is thus held by the spring it requires but one hand to perform the two operations, thereby leaving the other hand free to support the bicycle or for any other desired purpose. It will also be observed that as the spring automatically snaps into engagement with the adjacent end of the locking-bar when the latter is thrown upwardly said bar will be temporarily held in its operative position between adjacent spokes of the wheel, and therefore it is not essential that the bar be fixedly locked, as it will effectually prevent accidental turning of the wheel—as, for instance, upon inclined ground and when it is not desired to lock the wheel against unauthorized use of the bicycle.

From the foregoing description it will be apparent that there has been provided a locking-arm which is spring-extended in its operative position to lie between adjacent spokes of the bicycle-wheel, and is also held in its inoperative position by the same means.

What I claim is—

A device of the class described comprising the lock 7 provided in its casing with an opening and designed to be arranged on one side of the rear fork of a bicycle-frame and having a clamp for engaging the same, the clamp 8 for engaging the other side of the rear fork, the block fixed to the clamp 8 and having projecting sides extending toward the lock, the locking-bar 12 pivoted at one end between the sides of the block and arranged to swing across the space between the rear forks, and provided at its other end with a lug extending into an opening of the lock-casing, and a spring mounted on the block and engaging the pivoted end of the locking-bar and holding the lug thereof in the casing of the lock, to provide a temporary locking device, said spring being also adapted to hold the locking-bar at one side of the fork to prevent it from swinging inward and engaging the spokes of the wheel, substantially as described.

In testimony that I claim the foregoing as my own I have hereto affixed my signature in the presence of two witnesses.

HARRY T. RICH.

Witnesses:
C. ELLSWORTH HATCH,
CHAS. S. VIALL.